United States Patent Office 3,110,280
Patented Nov. 12, 1963

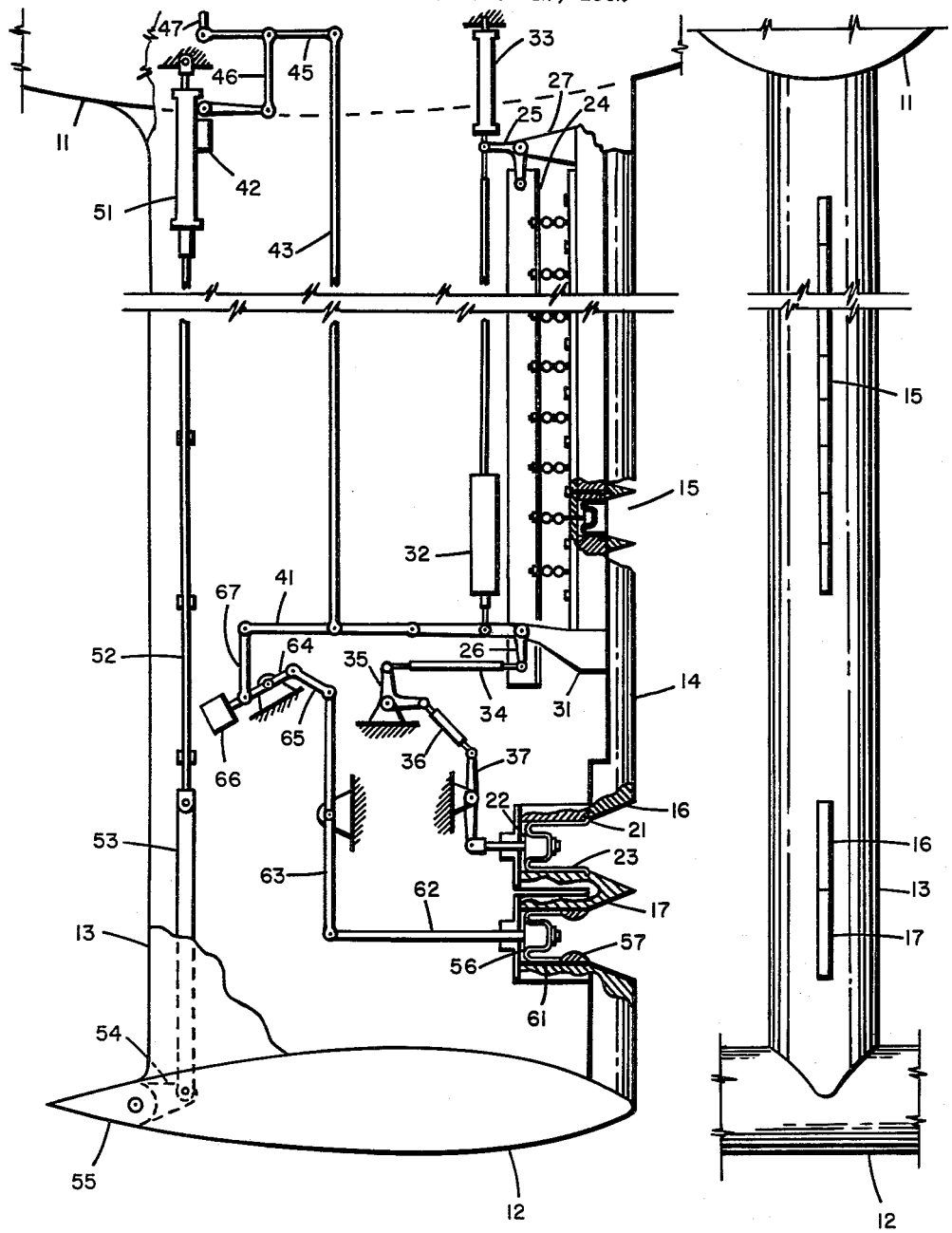

3,110,280
HYDROFOIL CRAFT STABILIZING DEVICE
Kenneth G. Hart, Rancho Santa Fe, and Roland E. Leadon, San Diego, Calif., assignors to General Dynamics Corporation, San Diego, Calif., a corporation of Delaware
Filed Oct. 12, 1962, Ser. No. 230,202
11 Claims. (Cl. 114—66.5)

This invention relates to marine craft of the type dynamically supported on submerged hydrofoils, and more particularly, to means for automatically stabilizing such craft.

Hydrofoil vessels are high speed craft provided with submerged hydrofoils or supporting fins which, at normal operating speeds of such craft, support such vessels above the water surface by hydrodynamic lift. As is well known to those skilled in the art, hydrofoil borne craft are capable of much higher speeds than conventional displacement vessels due to the much lower drag of hydrofoils than of displacement vessels. However, one of the major problems which has restricted the practical use of hydrofoil craft is the extreme difficulty of manual control in the foil borne condition. At reasonably high speeds, manual control is impossible. Difficuty of control is due to the fact that a submerged hydrofoil has virtually no depth stability. Therefore, the craft has no pitch or roll stability. It will be apparent that a suitable stabilizing device or autopilot functioning at all times while foil borne must be provided.

While an electronic autopilot may be provided for precise control at high speeds in rough seas, complete reliance on such a comparatively unreliable device on a passenger carrying vehicle is undesirable, since failure of the electronic device while under way foil borne at high speed may cause total loss of the craft and death or injury to the passengers. Usefulness of hydrofoil craft is considerably enhanced by provision of a simple, reliable mechanical stabilizing device. Such a stabilizing device enables manual control of hydrofoil craft. Where the greater precision of an electronic autopilot is required, as in connection with large, high speed craft operating in heavy seas, a simple, reliable mechanical stabilizing device serves as a safety device, backing up the electronic device. Without such a backup device, failure of the electronic autopilot may cause destruction of the craft, since it becomes uncontrollable due to the inherent instability.

Depth of submerged hydrofoil is controlled by means of a plurality of closely spaced orifices vertically arranged along the leading edge of the hydrofoil strut. Each orifice leads to an individual bellows, which are in turn connected to a force summing lever. The orifices are positioned on the strut so that half of them are submerged with the foil operating at the desired depth. An additional single orifice and associated bellows provides a force proportional to velocity balancing the hydrodynamic forces at the plurality of orifices summed by the force summing lever. A mechanical linkage between the force summing lever and the hydrodynamic force balancing orifice bellows connects to a hydraulic valve and an actuator, which moves the control flap on the hydrofoil. Thus, the control flap is moved in a direction keeping the predetermined number of depth sensing orifices submerged.

While depth sensing enables static stability, providing additional flap control responsive to vertical acceleration of the hydrofoil increases dynamic stability. Dynamic stability may be improved even further by determining rate of change of depth and providing an additional control force to move the control flap in response to rate of change of depth.

It is, therefore, an object of this invention to provide a hydrofoil stabilizing device.

Another object of this invention is to provide a mechanical hydrofoil stabilizing device enabling manual control of hydrofoil craft.

Another object of this invention is to provide a hydrofoil stabilizing device maintaining a hydrofoil supporting surface at a predetermined depth.

Another object of this invention is to provide a simple, inexpensive, reliable hydrofoil stabilizing device.

These and other objects and advantages of the present invention will become more apparent upon reference to the following description and appended drawing, wherein:

FIGURE 1 is a schematic side view of an embodiment of the hydrofoil stabilizing device of the present invention, and;

FIGURE 2 is a front view of the structure of FIGURE 1.

A hydrofoil craft having a hull 11 is supported underway by a hydrofoil lifting surface 12. A streamlined strut 13 having a leading edge spar 14 connects the hydrofoil lifting surface 12 to hull 11.

A plurality of vertically arranged depth sensing orifices, such as orifice 15, are provided abutting one another in the upper portion of leading edge spar 14 of strut 13. A force balancing orifice 16, and a force integrating orifice 17 are provided adjacent the supporting foil 12. Each orifice communicates to the open end of a cylinder fixed to leading edge spar 14, and a translatable piston. Exemplarily, the open end of a cylinder 21 is connected to orifice 16. Piston 22 is slidably mounted in cylinder 21. A rolling diaphragm seals the piston to the cylinder wall. As is well known to those skilled in the art, a rolling diaphragm is found in the shape of a closed end cylinder turned partially inside out. The open end of the diaphragm is connected to the wall of cylinder 21 at the open end adjacent orifice 16, and the closed end of the diaphragm is connected to the head of piston 22. As the piston moves with respect to the cylinder, the diaphragm rolls from the piston wall to the cylinder wall, or vice versa.

Each of the pistons associated with the depth sensing orifices 15 is connected to a force summing beam 24. Force summing beam 24 is pivotally connected to an upper bell crank 25, and to a lower bell crank 26. The center pivots of bell cranks 25 and 26 are supported by brackets 27 and 31, respectively, fixed to leading edge spar 14.

A mass 32 is supported between bell cranks 25 and 26. A spring 33, under tension, is connected between bell crank 25 and the frame of strut 13 to balance the weight of mass 32.

A non-linear linkage is provided between force balance piston 22 and bell crank 26. The non-linear linkage comprises a tie rod 34, having one end connected to bell crank 26, a bell crank 35 connected at one arm to tie rod 34, a tie rod 36 connected between bell crank 35 and a lever 37. The other end of lever 37 is connected to force balance piston 22.

As will be apparent from FIGURE 1, the horizontally depicted arm of bell crank 26 is longer than that shown vertically. The end of the longer arm is pivotally connected to a lever 41. An intermediate pivot on lever 41 is connected to a hydraulic servo control valve 42, through tie rod 43, lever 45, and tie rod 46, and to the pilot's controls via tie rod 47.

Hydraulic servo control valve 42 controls a dual hydraulic actuator, to which is connected a push-pull rod 52. Push-pull rod 52 is hingedly connected to tie rod 53, which in turn is connected to crank 54. Crank 54 is rigidly connected to hydrofoil control flap 55.

Additional dynamic stability is attained by a rate of change of depth control linkage connected to piston 56 adjacent to orifice 17. An annular flow restrictor 57 is fixed between orifice 17 and cylinder 61. A push rod 62 is connected to piston 56 at one end and to lever 63 at the other. Lever 63, fulcrumed at the center, actuates lever 64 through a link 65. Lever 64 is furnished with a bob weight 66 at one end. A link 67 connects lever 64 to lever 41.

The automatic stabilizing device of the present invention is designed so that at the operating depth of hydrofoil 12, half of the depth sensing orifices 15 are submerged. Each submerged piston applies a force to the force summing beam 24 equal to $\frac{1}{2}PV^2A$, where P is the mass density of the water, V is craft velocity, and A is the area of the piston. Therefore, the total force applied to the force summing beam 24 is equal to $\frac{1}{2}PV^2AN$, where N is the number of pistons submerged. Since N is approximately proportional to depth, the force is approximately proportional to depth as long as the velocity V remains constant.

If velocity V remained constant, depth sensing could be simply completed by restraining force summing beam 24 by means of an opposing linear spring. The position of the force summing beam 24 would then be directly proportional to strut depth. It may be shown that, under these conditions, the piston of the force summing beam $$P_{fsb} = \frac{\frac{1}{2}PV^2\left(\frac{\pi r}{2}\right)d}{K_s}$$

wherein $r$ is the radius of each piston, $d$ is the strut depth, and $K_s$ is the linear spring rate. Since velocity V is not constant in a practical hydrofoil craft, the denominator must vary if the relationship between X, the position of the force summing beam 24, and depth $d$ is to remain fixed. It will be apparent that the denominator term must be $K_sV^2$ to make the position of force summing beam 24 independent of velocity and dependent only upon depth. This can be accomplished by providing force balance piston 22 and the nonlinear linkage comprising lever 37, link 36, bell crank 35 and link 34. The force applied to the force summing beam 24 through the linkage is in opposition to the force generated by the depth measuring pistons. The force generated by the force balance piston 22 is equal to $\frac{1}{2}PV^2A_{fbp}$. The linkage ratio between the depth measuring pistons and the force balance piston 24 varies with the relative positions of lever 37, bell crank 35, and links 34 and 36. The relative lengths of the linkage elements is such that the force at force summing beam 24 due to force balance piston 22 is approximately equal to $$X_{fsb}(\frac{1}{2}PV^2A_{fbp}K_1)$$

where $K_1$ is the variable linkage ratio. It may be shown that, by combining and rearranging the above expressions, the position of force summing beam 24

$$X_{fsb} = d\left(\frac{\pi r_p}{2A_{fbp}K_1}\right)$$

where $d$=depth and $r_p$ is the effective radius of each depth measuring piston. Thus, the position of the force summing beam 24 is proportional to depth, and is independent of craft velocity.

The position of force summing beam 24 is also dependent upon vertical acceleration of the craft for greater dynamic stability. Mass 32 is provided to unbalance the linkage. Mass balance spring 33 statically balances the linkage unbalanced by mass 32 against the pull of gravity. Thus, when the hydrofoil craft is subject to a vertical acceleration, a force proportional to the product of the acceleration and mass 32 is created. This force causes bell cranks 25 and 26, and force summing beam 24, to deflect against the force balance piston 22 and nonlinear linkage 34, 35, 36, 37. Deflection of bell cranks 25 and 26, and force summing beam 24 caused by vertical acceleration is inversely proportional to $V^2$, causing a given vertical acceleration to deflect the linkage mass at low speeds than at high speeds.

Additional dynamic stability at high speed may be desired. Such may be attained by adding an additional factor proportional to rate of change of depth. Rate of change of depth may be approximated by the combination of piston 56, flow restrictor 57, push rod 62, lever 63, link 65, lever 64 with bob weight 66, link 67 and lever 41. Bob weight 66 measures vertical acceleration in the manner of mass 32. However, a partial integration of the vertical acceleration is performed by flow restrictor 57 between orifice 17 and cylinder 61.

Lever 41 has one end attached to the long arm of bell crank 26, and the other end to lever 64 through link 67. Assuming the end attached to link 67 is fixed, motion of force summing beam 24 in response to charges in depth and in vertical acceleration moves link 43. Thus, an increase in depth, or a downward acceleration moving mass 32 relatively upward, moves force summing beam 24 to the left in the drawing. The long arm of bell crank 26 moves upward, raising link 43, lever 45, link 46, and operating valve 42. Valve 42 allows hydraulic fluid under pressure to enter hydraulic actuator 51 in a direction to force rod 52 downwards, raising control flap 55 and causing hydrofoil 12 to move upwards. A decrease in depth, or an upward acceleration causes opposite movement of force summing beam 24, bell crank 26, lever 41, link 43, lever 45, and link 46, moving valve 42 in a direction admitting hydraulic fluid to actuator 51 in a direction pulling rod 52 and causing flap 55 to move downward. In a similar manner, an increase in the rate of decrease of depth causes an additional down increment of flap 55, while a decrease in the rate removes an increment of the down motion of flap 55. Changes in the rate of increase of depth are similarly damped by applying or removing angular increments of flap 55.

While a presently preferred embodiment of the invention has been specifically disclosed, it is understood that the invention is not limited thereto as many variations will be readily apparent to those skilled in the art and the invention is to be given its broadest possible interpretation within the terms of the following claims.

We claim:

1. A stabilizing device for a marine craft hydrodynamically supported by a submerged hydrofoil connected to said craft by a strut, comprising
    a plurality of depth sensing hydrodynamic force responsive means in orifices arranged on either side of the normal waterline at the leading edge of said strut,
    force summing means connected to said depth sensing hydrodynamic force responsive means,
    a force balance hydrodynamic force responsive means in an orifice at the leading edge of said strut adjacent a submerged hydrofoil,
    means connecting said force balance hydrodynamic force responsive means to said force summing means in opposition to said depth sensing hydrodynamic force responsive means,
    a control flap on said submerged hydrofoil,
    and means for moving said control flap in response to said force summing means.

2. A stabilizing device for a marine craft hydrodynamically supported by a submerged hydrofoil connected to said craft by a strut, comprising
    a plurality of depth sensing hydrodynamic force responsive means in orifices arranged on either side of the normal waterline at the leading edge of said strut,
    force summing means connected to said depth sensing hydrodynamic force responsive means,
    a force balance hydrodynamic force responsive means in an orifice at the leading edge of said strut adjacent a submerged hydrofoil, means connecting said force balance hydrodynamic force responsive means to said force summing means in opposition to said depth sensing hydrodynamic force responsive means, a control flap on said submerged hydrofoil, means connecting said force summing means to said control flap, and means for moving said control flap in response to said force summing means.

3. A stabilizing device for a marine craft hydrodynamically supported by a submerged hydrofoil connected to said craft by a strut, comprising a plurality of depth sensing pistons in orifices arranged on either side of the normal waterline at the leading edge of said strut, force summing means connected to said depth sensing pistons, a force balance piston in an orifice at the leading edge of said strut adjacent a submerged hydrofoil, means connecting said force balance piston to said force summing means in opposition to said depth sensing pistons, a control flap on said submerged hydrofoil, and means for moving said control flap in response to said force summing means.

4. A stabilizing device for a marine craft hydrodynamically supported by a submerged hydrofoil connected to said craft by a strut, comprising a plurality of depth sensing pistons in orifices arranged on either side of the normal waterline at the leading edge of said strut, force summing means connected to said depth sensing pistons, a force balance piston in an orifice at the leading edge of said strut adjacent a submerged hydrofoil, means connecting said force balance piston to said force summing means in opposition to said depth sensing pistons, a control flap on said submerged hydrofoil, means connecting said force summing means to said control flap, and means for moving said control flap in response to said force summing means.

5. A stabilizing device for a marine craft hydrodynamically supported for submerged hydrofoils connected to said craft by a strut, comprising a plurality of depth sensing pistons in orifices arranged on either side of the normal waterline at the leading edge of said strut, force summing means connected to said depth sensing pistons, a force balance piston in an orifice at the leading edge of said strut adjacent a submerged hydrofoil, a linkage connecting said force balance piston to said force summing means in opposition to said depth sensing pistons, a control flap on said submerged hydrofoil, and means for moving said control flap in response to said force summing means.

6. A stabilizing device for a marine craft hydrodynamically supported for submerged hydrofoils connected to said craft by a strut, comprising a plurality of depth sensing hydrodynamic force responsive means in orifices arranged on either side of the normal waterline at the leading edge of said strut, force summing means connected to said depth sensing hydrodynamic force responsive means, a force balance hydrodynamic force responsive means in an orifice at the leading edge of said strut adjacent a sumberged hydrofoil, a first linkage connecting said force balance hydrodynamic force responsive means to said force summing means in opposition to said depth sensing hydrodynamic force responsive means, a control flap on said submerged hydrofoil, means including a second linkage connecting said force summing means to said control flap, and means for moving said control flap in response to said force summing means.

7. A stabilizing device for a marine craft hydrodynamically supported by submerged hydrofoils connected to said craft by a strut, comprising a plurality of depth sensing pistons in orifices arranged on either side of the normal waterline at the leading edge of said strut, force summing means connected to said depth sensing pistons, a force balance piston in an orifice at the leading edge of said strut adjacent a submerged hydrofoil, a first linkage connecting said force balance piston to said force summing means in opposition to said depth sensing pistons, a control flap on said submerged hydrofoil, means including a second linkage connecting said force summing means to said control flap, and means for moving said control flap in response to said force summing means.

8. A stabilizing device for a marine craft hydrodynamically supported by a submerged hydrofoil connected to said craft by a strut, comprising a plurality of depth sensing pistons in orifices arranged on either side of the normal waterline at the leading edge of said strut, a force summing beam connected to said depth sensing pistons, a force balance piston in an orifice at the leading edge of said strut adjacent a submerged hydrofoil, a first linkage connecting said force balance piston to said force summing beam in opposition to said depth sensing pistons, a control flap on said submerged hydrofoil, means including a second linkage connecting said force summing means to said control flap, and means for moving said control flap in response to said force summing beam.

9. A stabilizing device for a marine craft hydrodynamically supported by a submerged hydrofoil connected to said craft by a strut, comprising a plurality of depth sensing hydrodynamic force responsive means in orifices arranged on either side of the normal waterline at the leading edge of said strut, force summing means connected to said depth sensing hydrodynamic force responsive means, vertical acceleration sensing means connected to said force summing means, a force balance hydrodynamic force responsive means in an orifice at the leading edge of said strut adjacent a submerged hydrofoil, a linkage connecting said force balance hydrodynamic force responsive means to said force summing means in opposition to said depth sensing hydrodynamic force responsive means, a control flap on said submerged hydrofoil, and means for moving said control flap in response to said force summing means.

10. A stabilizing device for a marine craft hydrodynamically supported by a submerged hydrofoil connected to said craft by a strut, comprising a plurality of depth sensing pistons in orifices arranged on either side of the normal waterline at the leading edge of said strut, a force summing beam connected to said depth sensing pistons, vertical acceleration sensing means connected to said force summing beam, a force balance piston in an orifice at the leading edge of said strut adjacent a submerged hydrofoil, a first linkage connecting said force balance piston to said force summing beam in opposition to said depth sensing pistons, a control flap on said submerged hydrofoil, means including a second linkage connecting said force summing beam to said control flap, and means for moving said control flap in response to said force summing beam.

11. A stabilizing device for a marine craft hydrodynamically supported by a submerged hydrofoil connected to said craft by a strut, comprising a plurality of depth sensing pistons in orifices arranged on either side of the normal waterline at the leading edge of said strut, a force summing beam connected to said depth sensing pistons, vertical acceleration sensing means connected to said force summing beam, a force balance piston in an orifice at the leading edge of said strut adjacent a submerged hydrofoil, a non-linear linkage connecting said force balance piston to said force summing beam in opposition to said depth sensing pistons, rate of change of depth sensing means including a rate piston in an orifice at the leading edge of said strut adjacent said force balance piston, a restriction in said orifice, and an unbalanced linkage connected to said rate piston, a control flap on said submerged hydrofoil, a linkage connecting said force summing beam and said unbalanced linkage to a hydraulic valve, and a hydraulic actuator for moving said control flap in response to said hydraulic valve.

No references cited.